Oct. 4, 1960   C. A. BONNER   2,954,744
MOVABLE TABLE PROPELLING AND RETARDING
MECHANISM AND MOUNTING FOR SAME
Original Filed Sept. 7, 1954   3 Sheets-Sheet 1

INVENTOR
CHARLES A. BONNER

BY  *Oscar L. Spencer*

ATTORNEY

INVENTOR
CHARLES A. BONNER

BY Oscar L Spencer

ATTORNEY

Oct. 4, 1960 C. A. BONNER 2,954,744
MOVABLE TABLE PROPELLING AND RETARDING
MECHANISM AND MOUNTING FOR SAME
Original Filed Sept. 7, 1954 3 Sheets-Sheet 3
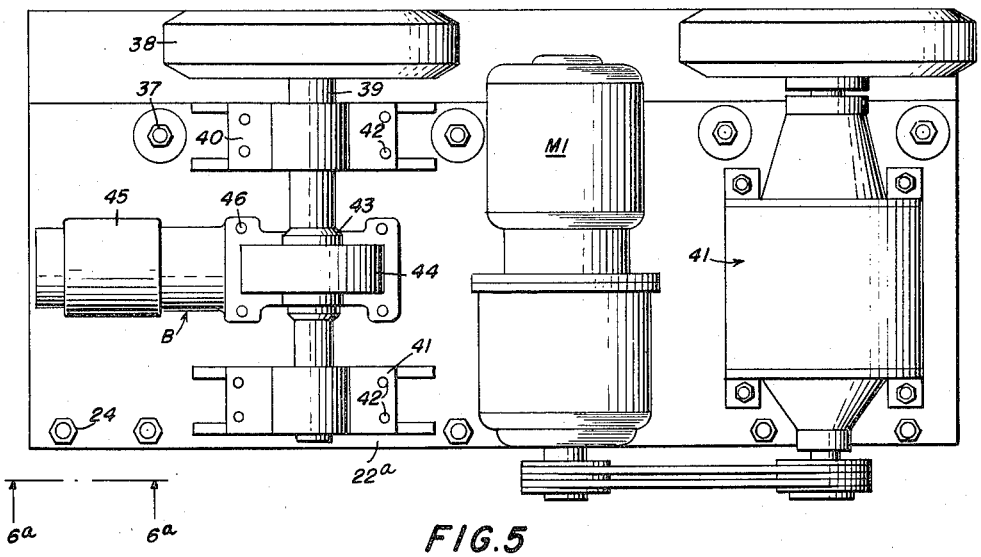
FIG.5
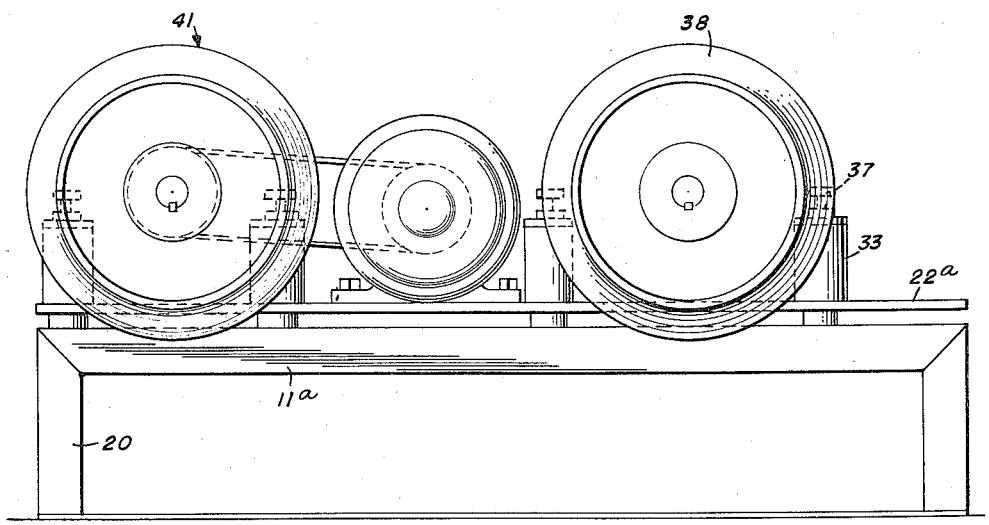
FIG.6
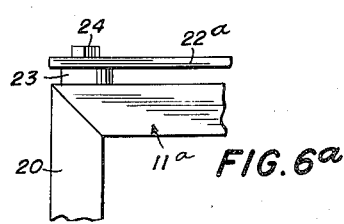
FIG.6ᵃ
INVENTOR
CHARLES A. BONNER
BY Oscar L. Spencer
ATTORNEY United States Patent Office 2,954,744
Patented Oct. 4, 1960

2,954,744

MOVABLE TABLE PROPELLING AND RETARDING MECHANISM AND MOUNTING FOR SAME

Charles A. Bonner, Ford City, Pa., assignor to Pittsburgh Plate Glass Company, Allegheny County, Pa., a corporation of Pennsylvania Original application Sept. 7, 1954, Ser. No. 454,433, now Patent No. 2,874,644, dated Feb. 24, 1959. Divided and this application May 21, 1958, Ser. No. 736,891

6 Claims. (Cl. 104—168)

My invention is directed to drive and retarding mechanism for movable tables moved on tracks and to the mounting of such mechanisms. This application is a division of my application Serial Number 454,433, filed September 7, 1954, now U.S. Patent 2,874,644, issued February 24, 1959.

In the manufacture of plate glass and sheet glass of certain kinds, the plates or sheets are placed on movable tables which are moved along on tracks under griding and polishing stations by means of an endless chain positioned under the movable tables. In order to utilize the tables again they are moved on down the track at the end of the endless chain by means of butting one table against the other. At the end of the track there is a transverse transfer track and transfer locomotive which moves the tables across to a return track to bring them back so that they may be used again in the grinding and polishing line. In order to carry out this method of handling the tables, it is necessary that a number of tables be used such that they abut one another between the end of the endless belt and the transfer track in order that they may be moved along as each table comes off the endless chain. So, also, by this method of returning the tables to the grinding and polishing line, the tables bump against each other in their movement and become damaged.

An object of my invention is to provide a stationary positioned drive unit having a rotating traction wheel which is positioned in the path of the movable table and such that it will contact same to move it forward when the traction wheel is rotated in contact with the table.

Another object of my invention is to provide a drive unit for a table or car having a vertically adjustable resilient mounting so that the traction wheel thereof may be brought into contact with the driving surface on the table being moved.

A further object of my invention is to provide a braking or retardation mechanism for interrupting the movement of the table as necessary.

Still further objects and the entire scope of applicability of the present invention will become apparent from the detailed description given hereinafter. It should be understood, however, that the detailed description and specific examples are given by way of illustration only, and, while indicating preferred embodiments of the invention, are not given by way of limitation, since various changes and modifications within the spirit and scope of the invention will become apparent to those skilled in the art from this detailed description.

For a more complete understanding of the nature and scope of my invention reference can be had to the following detailed description taken in connection with the accompanying drawings in which:

Fig. 5 is a top plan view of a combined drive unit and brake unit;

Fig. 6 is a side elevational view as viewed at the top of Fig. 5 of the combined mounting of a drive unit and braking unit; and Fig. 6a is a fragmentary showing of the support mounting for the platform of the combined drive and brake unit as viewed along line 6a—6a of Fig. 5.

Throughout the description like reference numerals refer to similar parts in the various figures of the drawings.

Figure 1:
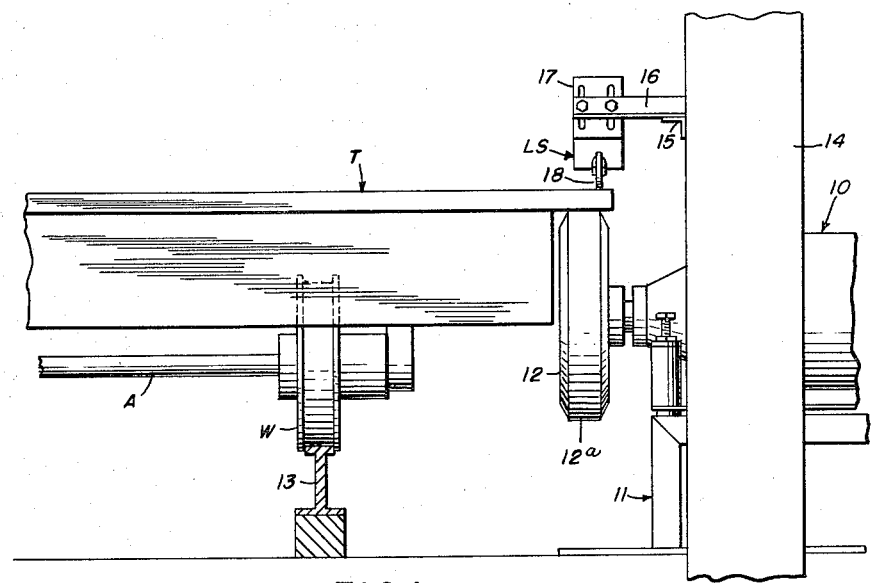
Fig. 1 is a fragmentary view of a movable table on a track being propelled by one of my drive units also fragmentarily shown.
Figure 2:
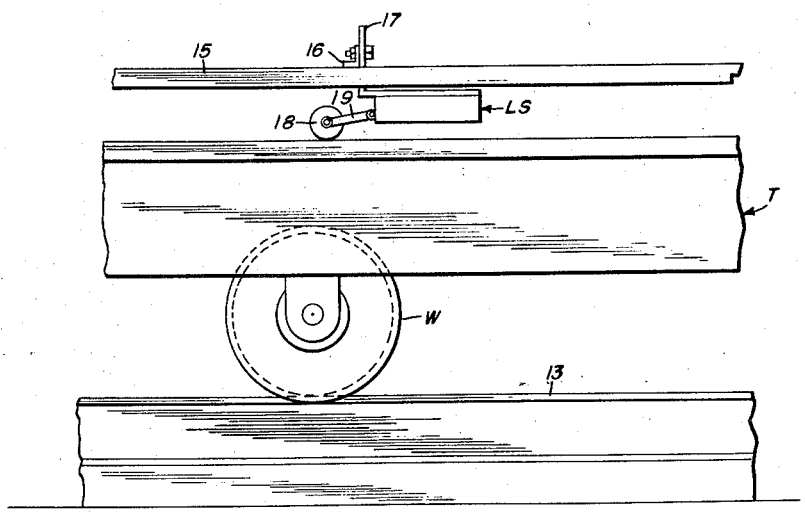
Fig. 2 is a side view of Fig. 1 showing the mounting of a limit switch above the table.

In Fig. 1 a drive mechanism is generally indicated at 10 mounted on a support frame 11 and having a drive wheel 12 with a rubber tire 12a for propelling a movable table T. Movable table T has typically illustrated one of its axles A with a wheel W supported for following engagement on track 13. A vertical column 14 has a longitudinally extending angle iron 15 extending parallel to track 13 and a transverse angle iron piece 16 is supported by angle iron 15. Supported on angle iron 16 above the movable table T is a vertically adjustable bracket plate 17 that supports a typical limit switch LS having a feeler wheel 18 on an arm 19 for contact with table T as shown in Fig. 2.

Figure 3:
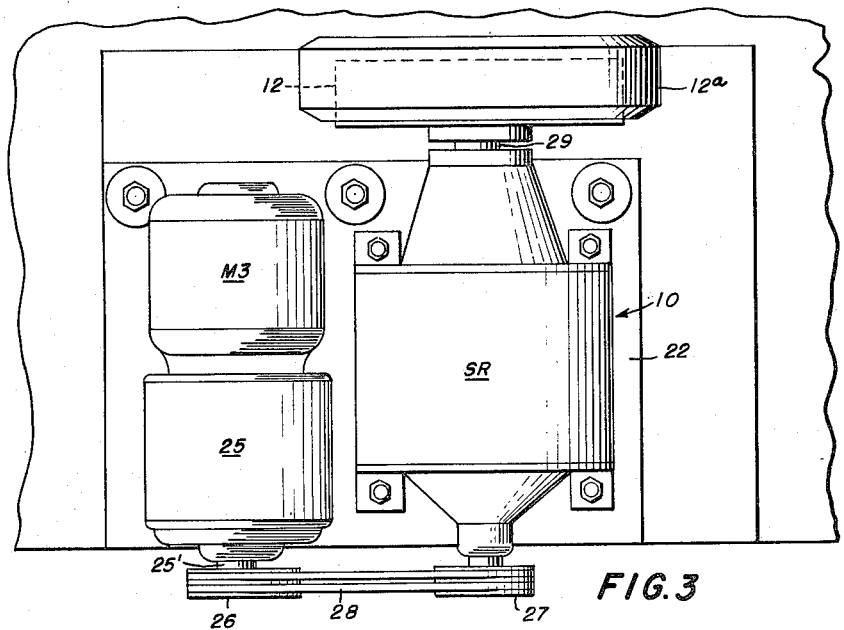
Fig. 3 is a plan view of a table run-out drive mechanism.
Figure 4:
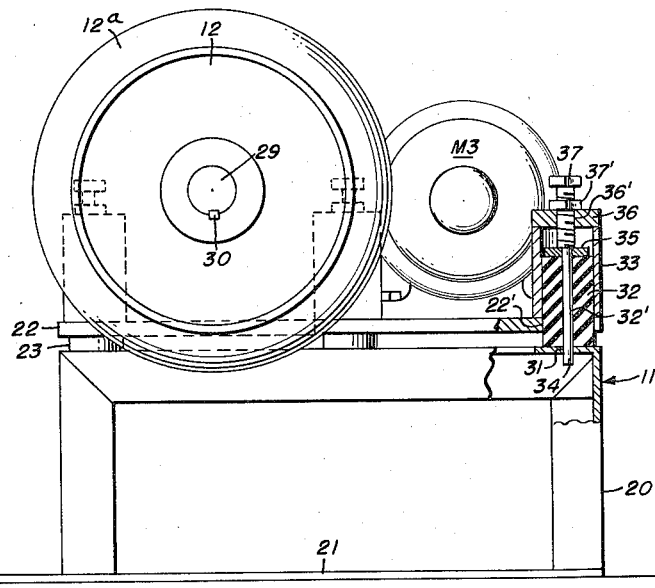
Fig. 4 is an end view as viewed from the top of Fig. 3 of the drive unit showing in section one of the resilient vertically adjustable mountings.

Referring to Figures 3 and 4, a typical drive unit will be described. An angle iron framework generally indicated at 11 having vertical legs 20 is supported on a horizontal mounting plate 21 attached to the vertical columns such as is illustrated by column 14. Platform 11 has mounted thereon a horizontal plate 22 which is spaced from platform arrangement 11 by rubber shims 23, see Fig. 6a. Suitable capscrews 24, see Fig. 6a, threadedly received in the top of frame 11 hold the plate 22a there shown, for Fig. 5 in place.

Mounted on the horizontal plate 22, as shown in Fig. 4, is an electric motor M3 which is combined with and drives a fluid-drive unit 25 having a V-belt pulley 26 attached to the drive shaft 25' thereof. Also mounted on plate 22 is a speed reducer SR having a V-belt drive pulley connected by the V-belts 28 to the pulley 26. The speed reducer SR has a drive shaft 29 extending out the opposite end from the drive pulley 27 and on it is keyed, as by key 30, the driven traction wheel 12 having the rubber tire 12a for drive against the underneath side of the table T as shown in Fig. 1.

Mounting plate 22 is vertically adjustable along the edge adjacent that is adjacent traction wheel 12 as will be explained. In Figures 3 and 4 it will be noted that the top of frame 11 has formed therein spaced apart apertures 31 along the edge which is adjacent the traction wheel 12. In plate 22 above the apertures 31 are apertures 22' to accommodate vertical extending cylindrical rubber spring members 32 to be described. Welded to plate 22 in concentric relation about apertures 22' are vertically extending tubular elements 33. Mounted in each tubular element 33 is the cylindrical rubber spring member 32 having a vertical aperture 32' which receives a securing pin 34 having affixed to its top end a top plate or washer 35 which rests on the top of the rubber cylindrical spring 32. Securing pin 34 extends through aperture 22' as does the cylindrical spring 32. Springs 32 are of sufficient length that they rest on the top of frame 11 and extend upward within spaced relation of the top of the enclosing circular tube 33. Secured to the top of tube 33, as by welding, is a washer-like plate or cap 36 having a threaded capscrew 37, the bottom end of which rides against the top plate or washer 35 of the pin 34. Thus, by adjusting the capscrew 37 in each of the spring mountings, the plate 22 may be adjusted vertically. Capscrew 37 is held in adjusted position by a lock nut 37'. Further, the cylindrical rubber spring element 32 provides a resilient mounting for the front edge or wheel engaging edge of the whole drive unit 10. As the hard rubber or composition tire 12a on wheel 12 wears away, screws 37 may be adjusted to raise the unit to compensate for the wear of the tire 12a.

In Figures 5 and 6 there is shown a combined mounting of a drive unit and brake or retarding mechanism for the movable tables T. A mounting plate 22a similar to mounting plate 22 is supported on a framework generally indicated at 11a similar to framework 11 in Figures 1, 3 and 4. A drive unit generally indicated at 41 is mounted on the plate 22a and adjacent thereto is a brake unit generally indicated at B. Drive unit 41 is like drive unit 10 described above. Brake unit B consists of a traction wheel 38 of similar size to the wheel 12 on drive unit 10. Traction wheel 38 is mounted on a shaft 39 supported in spaced apart pillow block bearings at 40 and 41 bolted to plate 22 as by the bolts 42. Shaft 39 is formed with a hub 43 at its center to which is keyed a brake drum 44. An electromagnetic brake element 45 is associated with brake drum 44 and is bolted to the plate 22a as by bolts 46.

The drive and braking units here shown and their resilient mounting provide for positive drive and braking for each table T. The mounting including the novel resilient support elements so positioned and spaced and the adjustable positioning features to compensate for wear of tires of drive and brake units provides highly efficient and reliable drive and brake units.

I claim as my invention:

1. A traction drive unit for engagement with and propelling cars along a track comprising, in combination, a base frame, a mounting plate, means resiliently supporting said mounting plate on said frame, a drive motor means and a speed reducer mounted on said plate, drive means coupling said drive motor means to said speed reducer, said speed reducer having a traction wheel attached and driven thereby for engagement with the cars being propelled along a track, said means resiliently supporting said mounting plate on said frame comprising resilient washer elements disposed between said plate and frame and holding said plate, washer elements and frame together, and an adjustable resilient support between said base frame and said plate for adjusting the traction wheel in its propelling contact with a car, said adjustable resilient support comprising, a tubular member fixed to the top of said mounting plate and surrounding an aperture through said plate, a resilient and compressible element mounted in said tubular element and extending through said aperture in the plate and resting at its bottom end on said frame, a cap fixed to the top of said tubular element and having a threaded aperture extending therethrough, a screw member threadedly received in said threaded aperture and having engagement at one end with the top of said resilient and compressible element whereby on screwing down said screw against the top of said resilient and compressible element it moves said cap and attached tubular member and mounting plate to which the tubular element is attached away from said base frame, whereby said mounting plate is resiliently and adjustably mounted on said base frame.

2. A traction drive unit according to claim 1 wherein said drive motor means comprises an electric motor and a hydraulic drive unit driven thereby and said speed reducer is drivingly connected to said hydraulic drive unit and driven thereby.

3. A traction drive unit for engagement with and propelling cars along a track comprising, in combination, a base frame; a mounting plate; resilient mounting means including an adjustable and resilient support for attaching said mounting plate on said base frame; a drive motor means mounted on said mounting plate; a speed reducer mounted on said mounting plate and having a traction wheel attached and driven thereby for engagement with and propelling cars along a track, and drive means coupling said drive motor means to said speed reducer, said resilient mounting means comprising resilient washer elements disposed between said frame and said mounting plate along one edge of said mounting plate, bolt means extending between said mounting plate and base frame and holding said mounting plate, washer elements and base frame together, said adjustable and resilient support being positioned along an edge opposite said first mentioned edge of said mounting plate and between the base frame and the mounting plate, said adjustable and resilient support comprising, a tubular member fixed to the top of said mounting plate and surrounding an aperture through said mounting plate, a resilient and compressible element mounted in said tubular element and extending through said aperture in the plate and resting at its bottom end on said base frame, a cap plate fixed to the top of said tubular element and having a threaded aperture extending therethrough, a screw member threadedly received in said threaded aperture and having engagement at one end with the top of said resilient and compressible element whereby on screwing down said screw against the top of said resilient and compressible element it moves said cap plate and attached tubular member and mounting plate away from said base frame, whereby said mounting plate is resiliently and adjustably mounted on said base frame; said traction wheel being disposed adjacent the same edge of the mounting plate as is said adjustable and resilient support so that the traction wheel may be brought into engagement with the car propelled thereby.

4. A traction drive unit according to claim 3 wherein said base frame below said resilient and compressible element is apertured, said resilient and compressible element is a cylindrical rubber member having an aperture extending lengthwise therethrough to receive a pin which extends therethrough and into said aperture in the base frame therebelow and a transverse plate element attached to the top of said pin and resting on the top of said rubber member and against which the bottom of said screw member in said top plate attached to the top of the tubular member bears.

5. A mounting for machine members comprising a base frame; a plate for mounting said machine members; and a plurality of spaced apart adjustable resilient means for mounting said plate on said base frame comprising a tubular member fixed to the top of said plate and surrounding an aperture extending through said plate, a resilient and compressible element mounted in said tubular element and extending through said aperture in the plate and resting at the bottom end on said frame, a cap fixed to the top of said tubular element and having a threaded aperture extending therethrough, a screw member threadedly received in said threaded aperture and for engagement at one end with the top of said resilient and compressible element whereby screwing down said screw against the top of said resilient and compressible element moves said cap, tubular element and plate to which said tubular element is attached away from said base frame and said plate is resiliently supported on said frame.

6. A retardation brake unit of the rotary type for frictional engagement with cars along a track comprising, in combination, a base frame; a mounting plate for said retardation brake unit; resilient mounting means for said mounting plate on said frame; said resilient mounting means comprising resilient washer elements disposed between said frame and said mounting plate along one edge of said mounting plate, bolt means extending between said mounting plate and frame and holding said mounting plate, washer elements and frame together, and an adjustable resilient support along the opposite edge from said first mentioned edge and between said mounting plate and surrounding an aperture through said mounting plate, a resilient and compressible element mounted in said tubular element and extending through said aperture in the mounting plate and resting at its bottom end on said frame, a plate fixed to the top of said tubular element and having a threaded aperture extending therethrough, a screw member threadedly received in said threaded aperture and for engagement at one end with the top of said resilient compressible element whereby screwing down said screw against the top of said resilient and compressible element moves said tubular element and mounting plate to which it is attached away from said base frame and said mounting plate is resiliently supported on said frame; said retardation brake unit having a car engaging friction wheel disposed adjacent the edge of said mounting plate adjacent which said adjustable resilient support is mounted.

References Cited in the file of this patent

UNITED STATES PATENTS

| | | |
|---|---|---|
| 1,054,943 | Schmidt et al. | Mar. 4, 1913 |
| 1,423,947 | Kramer et al. | July 25, 1922 |
| 2,019,182 | Gipe et al. | Oct. 29, 1935 |
| 2,044,134 | Storer | June 16, 1936 |
| 2,538,658 | Saurer | Jan. 16, 1951 |
| 2,547,075 | Cook | Apr. 3, 1951 |
| 2,585,107 | Geldhof | Feb. 7, 1952 |
| 2,683,007 | Iredell | July 6, 1954 |

UNITED STATES PATENT OFFICE
CERTIFICATE OF CORRECTION

Patent No. 2,954,744                                                                     October 4, 1960

Charles A. Bonner

It is hereby certified that error appears in the printed specification of the above numbered patent requiring correction and that the said Letters Patent should read as corrected below.

Column 3, line 44, after "said" insert -- frame and said plate, bolt means extending between said --.

Signed and sealed this 11th day of April 1961.

(SEAL)
Attest:
ERNEST W. SWIDER
Attesting Officer

ARTHUR W. CROCKER
Acting Commissioner of Patents